United States Patent
Kumar et al.

(10) Patent No.: US 10,547,562 B2
(45) Date of Patent: Jan. 28, 2020

(54) CLOUD RESOURCE POOL

(71) Applicant: Hewlett Packard Enterprise Development LP, Houston, TX (US)

(72) Inventors: Munirathnam Kumar, Bangalore (IN); Adarsh Suparna, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 249 days.

(21) Appl. No.: 15/329,296

(22) PCT Filed: Sep. 10, 2014

(86) PCT No.: PCT/US2014/054998
§ 371 (c)(1),
(2) Date: Jan. 26, 2017

(87) PCT Pub. No.: WO2016/018438
PCT Pub. Date: Feb. 4, 2016

(65) Prior Publication Data
US 2017/0237679 A1    Aug. 17, 2017

(30) Foreign Application Priority Data
Jul. 31, 2014  (IN) ............... 3766/CHE/2014

(51) Int. Cl.
*G06F 15/173* (2006.01)
*H04L 12/911* (2013.01)
*H04L 29/08* (2006.01)

(52) U.S. Cl.
CPC .......... *H04L 47/70* (2013.01); *H04L 67/1097* (2013.01); *H04L 67/16* (2013.01)

(58) Field of Classification Search
CPC ...................................................... H04L 47/70
USPC ........................................................ 709/226
See application file for complete search history.

(56) References Cited

U.S. PATENT DOCUMENTS

| | | | |
|---|---|---|---|
| 7,007,075 B1 | 2/2006 | Coffey | |
| 8,433,803 B2* | 4/2013 | Madduri | G06F 9/5005 705/2 |
| 8,495,197 B1 | 7/2013 | Nagargadde et al. | |
| 9,032,360 B1* | 5/2015 | Cohen | G06F 11/3684 717/103 |
| 9,535,663 B2* | 1/2017 | Yaseen | |
| 2006/0218279 A1* | 9/2006 | Yamaguchi | H04L 67/1008 709/226 |
| 2010/0325277 A1* | 12/2010 | Muthiah | G06F 9/50 709/226 |

(Continued)

OTHER PUBLICATIONS

Gorg et al., "Real-Time Collaboration and Experience Reuse for Cloud-Based Workflow Management Systems", 2013 IEEE Conference on Business Informatics, 2013, pp. 392-398.*

(Continued)

*Primary Examiner* — Anthony Mejia
(74) *Attorney, Agent, or Firm* — Hewlett Packard Enterprise Patent Department

(57) ABSTRACT

In one implementation, a cloud resource system includes a resource engine and configuration engine. The resource engine can identify a cloud resource based on a template and assign the cloud resource based on a subscription and the template. The configuration engine can maintain a pool of cloud resource object instances.

12 Claims, 6 Drawing Sheets

(56) References Cited

U.S. PATENT DOCUMENTS

| | | | |
|---|---|---|---|
| 2011/0131341 A1 | 6/2011 | Yoo et al. | |
| 2011/0138055 A1* | 6/2011 | Daly | G06F 9/505 709/226 |
| 2011/0149737 A1* | 6/2011 | Muthiah | G06F 9/5011 370/235 |
| 2011/0307412 A1* | 12/2011 | Rolia | G06Q 10/06 705/348 |
| 2012/0173709 A1* | 7/2012 | Li | G06F 9/5011 709/224 |
| 2013/0036213 A1* | 2/2013 | Hasan | H04L 67/1097 709/223 |
| 2013/0097680 A1 | 4/2013 | Bendapudi et al. | |
| 2013/0179574 A1 | 7/2013 | Calder et al. | |
| 2013/0232498 A1* | 9/2013 | Mangtani | G06F 9/5072 718/104 |
| 2013/0297544 A1* | 11/2013 | Allgaier | G06N 20/00 706/46 |
| 2013/0311598 A1* | 11/2013 | Arrouye | G06Q 10/10 709/217 |
| 2013/0311986 A1* | 11/2013 | Arrouye | G06F 8/61 717/175 |
| 2013/0326510 A1 | 12/2013 | Adekile et al. | |
| 2013/0339470 A1 | 12/2013 | Jeswani et al. | |
| 2014/0012995 A1* | 1/2014 | Zhang | H04L 47/785 709/226 |
| 2014/0059226 A1 | 2/2014 | Messerli et al. | |
| 2014/0073370 A1* | 3/2014 | Lee | H04W 4/06 455/509 |
| 2014/0075319 A1 | 3/2014 | Kuo et al. | |
| 2014/0221032 A1* | 8/2014 | Yang | H04W 4/70 455/509 |
| 2014/0280946 A1* | 9/2014 | Mukherjee | H04L 67/16 709/226 |
| 2014/0282359 A1* | 9/2014 | Feblowitz | G06F 8/20 717/104 |
| 2014/0304352 A1* | 10/2014 | Chaudhary | G06F 9/5011 709/208 |
| 2015/0242623 A1* | 8/2015 | Lindo | G06F 21/552 726/23 |
| 2015/0261561 A1* | 9/2015 | Ashok | G06F 9/45558 718/1 |
| 2016/0098172 A1* | 4/2016 | Bacinschi | G06F 8/38 715/747 |
| 2016/0149825 A1* | 5/2016 | Darji | G06F 9/546 709/226 |
| 2016/0239595 A1* | 8/2016 | Maes | G06F 9/5061 |
| 2016/0357538 A1* | 12/2016 | Lewallen | G06F 8/61 |
| 2017/0199752 A1* | 7/2017 | Cao | G06F 9/45558 |
| 2017/0220459 A1* | 8/2017 | Kulkarni | G06F 11/3688 |

OTHER PUBLICATIONS

Applied Cloud Computing, "Platform As a Service", A Cloud Implementation System Integration Company, Retrieved on Aug. 3, 2014, 11 pages.

Chen, Y. et al., "An Efficient Resource Management System for On-line Virtual Cluster Provision", IEEE 2009 International Conference on Cloud Computing, Sep. 7, 2009, 11 pages.

Chiu, D. et al., "Elastic Cloud Caches for Accelerating Service-Oriented Computations", Ohio State University, Department of Computer Science, 2010, 11 pages.

Korean Intellectual Property Office, International Search Report & Written Opinion, dated Apr. 21, 2015, 11 pages, Daejeon Metropolitan City, Republic of Korea.

\* cited by examiner

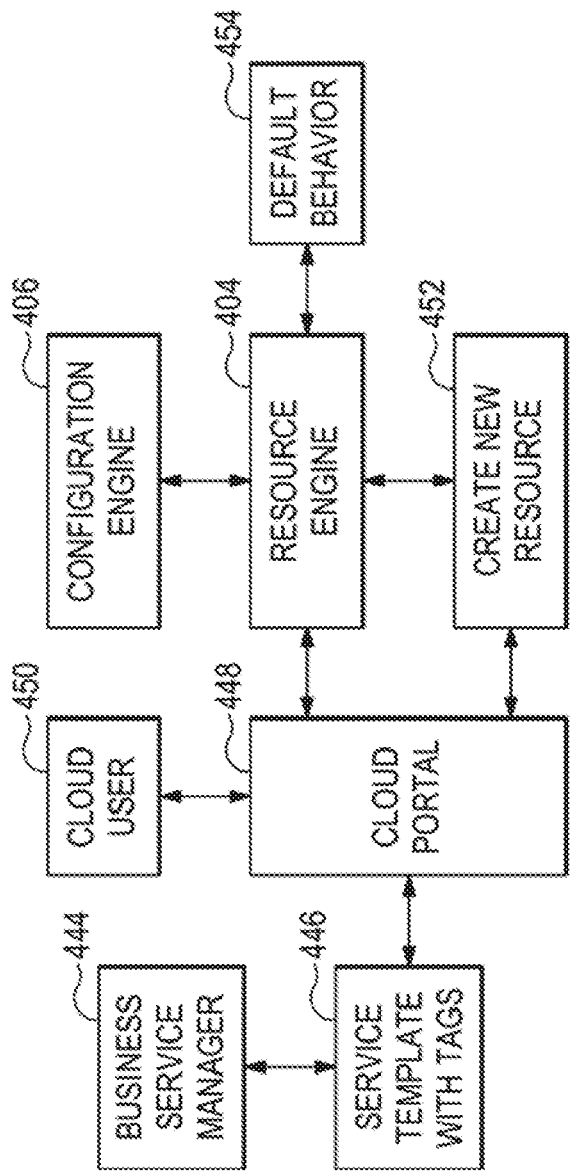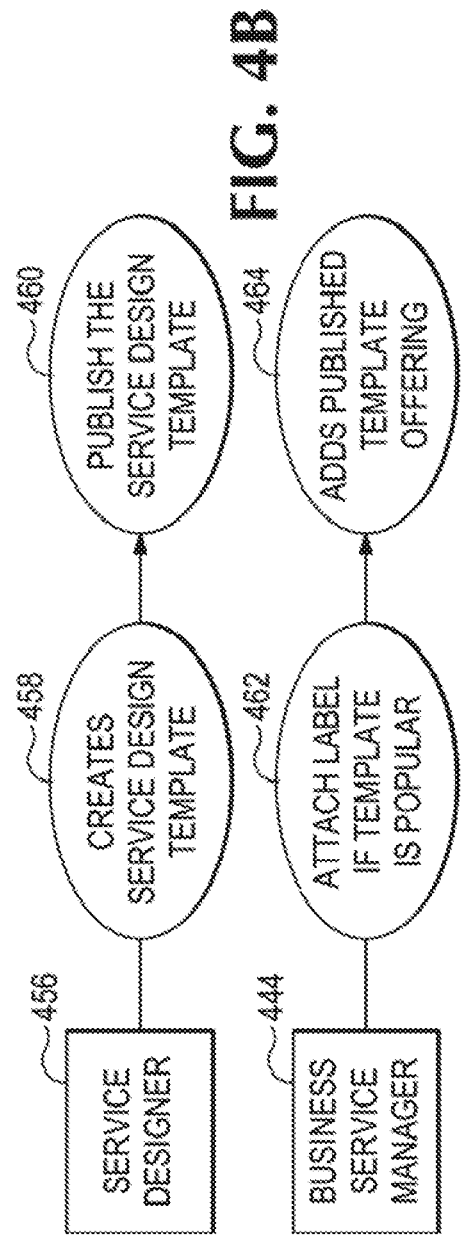

CLOUD RESOURCE POOL

BACKGROUND

Services are commonly offered via the cloud to support client demand. A cloud can include a virtual shared pool of resources for providing the service offering. Resources of a cloud can include infrastructure, storage, network, and other middleware applications to support a service. A cloud can increase or decrease allocated resources based on a subscription for the service. For example, resources can be allocated to a customer upon initiation of a subscription and resources can be released when the subscription terminates.

BRIEF DESCRIPTION OF THE DRAWINGS

FIGS. 4A and 4B are block diagrams depicting example interactions of example cloud resource system components.

DETAILED DESCRIPTION

In the following description and figures, some example implementations of cloud resource systems and/or methods of reusing a cloud resource are described. In a heterogeneous cloud environment, data center resources can be distributed across multiple providers. Created subscriptions can allocate resources objects from the cloud system based on a cloud broker application. For example, the cloud broker can interact with a centralized repository of virtual machine images templates to provide a service from each template. Cancelled subscriptions can delete the realized resource objects from the cloud system and release the resources back to the resource provider. Creating a resource can be time consuming and/or processing intensive. For example, resource creation (or recreation) for a new subscription can take hours and can cause failure due to various availability factors.

Various examples described below relate to maintaining a pool of cloud resources based on a template. Maintaining resources in a pool consistent with a template of composite resources allows for resources to be added to a subscription using the template at the cloud broker layer instead of creating resources from scratch. The life cycle of the resource objects cached in the pool can be managed based on potential reusability, such as popularity or frequency of request. A template can be a model to promote popularity and reuse. Associating a cloud resource object instance with a template that is recognizable across the cloud broker layer allows for the cloud resource object instance to be reused and avoid recreation of popular resources requested by various subscriptions.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, manage, and/or modify."

Figure 1:
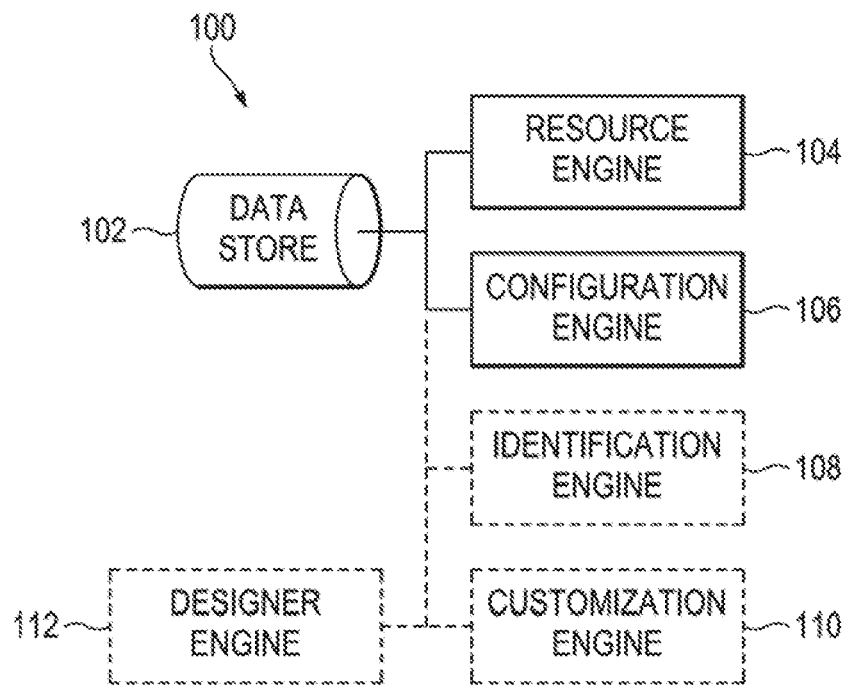
FIGS. 1 and 2 are block diagrams depicting example cloud resource systems.
Figure 2:
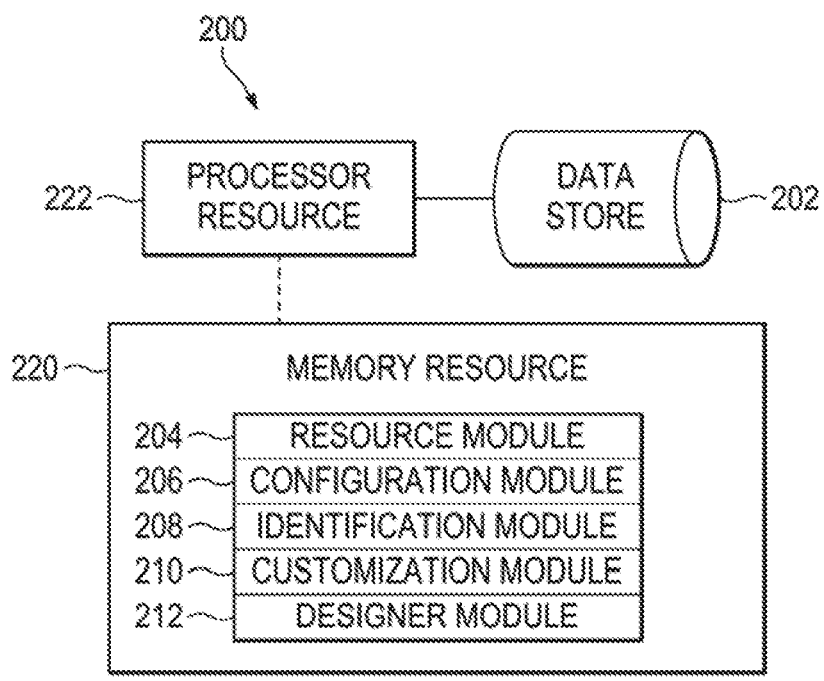

FIGS. 1 and 2 are block diagrams depicting example cloud resource systems. Referring to FIG. 1, the example cloud resource system 100 of FIG. 1 generally includes a data store 102, a resource engine 104 and a configuration engine 106. In general, the configuration engine 106 can maintain a pool of cloud resource objects for the resource engine 104 to assign to a subscription based on a template. The example cloud resource system 100 can also include an identification engine 108, a customization engine 110, and a designer engine 112 to facilitate cloud resource assignment.

The resource engine 104 represents circuitry or any combination of circuitry and executable instructions to manage cloud resources usable by a subscription based on a template. For example, the resource engine 104 can include circuitry or a combination of circuitry and executable instructions to identify a cloud resource based on a template and assign the cloud resource based on a relationship between a subscription and the template.

A cloud resource is any resource available from a cloud, such as a compute resource, a network resource, or a storage resource. Example cloud resources include a processor resource, a memory resource, an application, a database, a network flow, a firewall, a load balancer, etc. whether virtual or physical. A template represents a composition of cloud resources. A cloud resource object instance is a specific realization of a data structure class having a composition of cloud resources. The template acts as the blueprint (i.e. construction framework) for the service by providing the classes of resources and the connections between the resources to produce a cloud resource object instance having the composition designated by the template. Thus a cloud resource object instance can be particularly configured for a particular service (e.g. as designed by the designer of the template which is described in more detail with regards to the designer engine 112). A template can represent a resource stack associated with a service.

Subscriptions can be offered by a cloud broker to a customer. A subscription represents maintaining provisioning of a service or combination of services. A cloud service represents a functionality or combination of functionalities that supply the offerings of a subscription, such as offering a cloud storage resource. Services can be offered based on a distribution model, such as software as a service ("SaaS"), platform as a service ("PaaS"), and infrastructure as a service ("IaaS"). A relationship between a subscription and a template can be based on the service, such as the distribution model of the service. A service may utilize a template or combination of templates to realize the service (e.g. allocate resources, execute applications, and offer the service). The template can be related to the subscription based on the execution environment and operating conditions to perform or otherwise offer the service.

The resource engine 104 can automate the process of caching and reassigning a cloud resource for popular or frequently used offerings by managing the cloud resource object instances of each subscription offered by a cloud broker. The cloud broker layer is a beneficial logical layer to make resource reassignment decisions to catch resources at the time a subscription ends (or updates) and when a subscription begins (or updates) before the resource is released.

The resource engine 104 can verify the pool of cloud resource object instances contains a cloud resource object instance based on a template associated with the subscription. For example, identifying a cloud resource based on a template can include verifying a cloud resource object instance exists that has the composite of the cloud resources associated with the template of the subscription. If such a cloud resource object instance exists, a specific instance can be identified for attachment to a subscription and that particular cloud resource object instance can be assigned to the subscription. If no associated cloud resource object instance exists in the pool, the resource engine can cause a cloud resource object instance to be created based on the template and cause the cloud resource object to be added to the pool for attachment to a subscription. For another example, the number of cloud resource object instances associated with a template may meet a minimum threshold and the resource engine can cause an appropriate cloud resource object instance to be created and added to the pool.

The configuration engine 106 represents circuitry or any combination of circuitry and executable instructions to maintain a pool of cloud resource object instances. A pool of cloud resource object instances is a group of cloud resource object instances that are hibernating (e.g. in a paused state of operation) or otherwise not assigned to or operating for a subscription. The configuration engine 106 can maintain the pool based on a template. For example, the cloud resource object instances can have a composition of resources associated with a template. The configuration engine can maintain the pool of cloud resources based on reusability. For example, the pool can include cloud resource object instances from frequently requested templates.

The configuration engine 106 can manage pooled resource object instances based on limitations of the cloud system. In other words, the characteristics of the cloud system can be used to configure the cache pool. Alternatively, or in addition to, the configuration engine 106 can manage the pool based on configurations provided by an administrator. Various factors may influence the service offering of a cloud system and resource objects offered from a pool managed by the configuration engine 106. For example, the pool can parameterize the lifetime of the resource object in the pool and a minimum and/or maximum number of resource objects of the pool based on the number of offerings of a service at the cloud broker layer.

The identification engine 108 represents circuitry or any combination of circuitry and executable instructions to identify a reusability potential of a cloud resource object instance. For example, the request for a template may exceed a minimum number of requests per day and the template can be labeled as frequently used. For another example, a template may be part of a number of services offered at the cloud broker layer and can be labeled as highly reusable. Reusability potential represents the likelihood that the cloud resource object instance would be useable in a future request. Reusability potential determinations can be based on administrator input statistical analysis, and/or default parameters. For example, a set of templates may include a label that is statically set by an administrator. In another example, the system 100 can receive static ranges, such as a minimum or maximum number of requests for a service, and/or analysis methods to determine dynamic ranges that utilize historical information from the cloud broker layer. Reusability potential can be based on request frequency, popularity, service offerings, lifetime of subscription, service level agreement ("SLA") terms, and/or other factors associated with a cloud system managed by the cloud broker and services offered by the cloud system. A label can be represented as a value, a number, a string, a Boolean, a category, a tag, or any other structure capable of identifying a status.

A cloud resource object instance can be identified as having a reusability potential based on a label associated with the template and/or metadata associated with the cloud resource object instance. For example, the data structure or metadata associated with a cloud resource object instance can inherit a label from a template, and the object resource can be identified as reusable based on the existence of the label or on a match of the label with an identified reusability for the pool, such as a pool of popular cloud resource objects can contain cloud resource object instance with a label of popular.

The customization engine 110 represents circuitry or any combination of circuitry and executable instructions to modify the cloud resource object instance. A cloud resource object instance can be modified by flexing the resources or otherwise configuring the resources of the cloud resource object instance based on the subscription. For example, the cloud resource object instance may include a base quantity of resources that are to be doubled for a new subscription request by another customer. For another example, the applications of the cloud source object instance can be configured with an account associated with the user of the subscription. In this manner, the cloud resource object instance can be customized based on the request of the user, such as flexing the resources of the object instance (e.g. increasing or decreasing a resource) or adding additional resources.

The designer engine 112 represents circuitry or any combination of circuitry and executable instructions to maintain a template. For example, the designer engine 112 can be a combination of circuitry and executable instructions to model the template based on a composite resource context for a subscription request and publish the template for selection by users for future subscription requests. The designer engine 112 can attach a label to the template based on administrator input or when the template achieves the threshold of requests based on the identification engine 108.

The designer engine 112 can used to design a composite resource template as a configuration framework of a combination of infrastructure and applications. For example, the combination of infrastructure and applications can be loadable on the cloud resource stack to provide a service offered. As used herein, the term "application" refers to a set of executable instructions that provide a service when executed by a processor resource. The designer engine 112 can provide a template of resource and connections between resources for selection and/or otherwise association with a subscription based on publishing the template in a form presentable by a display communicating with an application, such as a browser.

The data store 102 can contain information utilized by the engines 104, 106, 108, 110, and 112. For example, the data store 102 can store a cloud resource object instance, a label, a template, subscription parameters, and the like.

FIG. 2 depicts the example cloud resource system 200 can be implemented on a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as a resource module 204, a configuration module 206, an identification module 208, a customization module 210, and a designer module 212. The processor resource 222 can carry out a set of instructions to execute the modules 204, 206, 208, 210, 212, and/or any other appropriate operations among and/or associated with the modules of the system 200. For example, the processor resource 222 can carry out a set of instructions to maintain a pool of cloud resource object instances, identify a cloud resource object instance based on a composite resource template and a reusability potential of the cloud resource object instance, configure a cloud resource object instance of the pool based on a subscription request, and assign a cloud resource object instance based on the subscription request. For another example, the set of instructions can cause the processor resource 222 to maintain a label associated with the cloud resource object instance, assign the cloud resource object instance based on the label, and flex a resource of the cloud resource object instance one of up and down based on the subscription request. The resource module 204, the configuration module 206, the identification module 208, the customization module 210, and the designer module 212 represent program instructions that when executed function as the resource engine 104, the configuration engine 106, the identification engine 108, the customization engine 110, and the designer engine 112 of FIG. 1, respectively.

The processor resource 222 can be any appropriate circuitry capable of processing (e.g. compute) instructions. For example, the processor resource 222 can be a central processing unit (CPU) that enables cloud resource management by fetching, decoding and executing modules 204, 206, 208 210, and 212. Example processor resources 222 include CPUs, semiconductor-based microprocessors, application specific integrated circuits ("ASIC"), a field-programmable gate array ("FPGA"). The processor resource 222 can be one or multiple processing elements capable of retrieving instructions from the memory resource 220 and executing those instructions. Such multiple processing elements can be integrated in a single device or distributed across devices. The processor resource 222 can process the instructions serially, concurrently, or in partial concurrence.

The memory resource 220 and the data store 202 represent a medium to store data utilized and/or produced by the system 200. The medium can be a non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The medium can be an electronic, magnetic, optical, or other physical storage device that is capable of containing (i.e. storing) executable instructions. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The o resource 220 and the data store 202 can represent the same physical medium or separate physical mediums. The data of the data store 202 can include representations of data and/or information mentioned herein.

In the discussion herein, the engines 104, 106, 108, 110, and 112 of FIG. 1 and the modules 204, 206, 208, 210, and 212 of FIG. 2 have been described as circuitry or a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In one example, the executable instructions can be part of an installation package that when installed can be executed by the processor resource 222 to implement the system 200. In that example, the memory resource 220 can be a portable medium such as a compact disc, a digital video disc, a flash drive, or memory maintained by a computer device, such as a service device 334 of FIG. 3, from which the installation package can be downloaded and installed. In another example the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resume 220 can include integrated memory such as a hard drive ("HD"), a solid state drive ("SSD"), or an optical drive.

Figure 3:
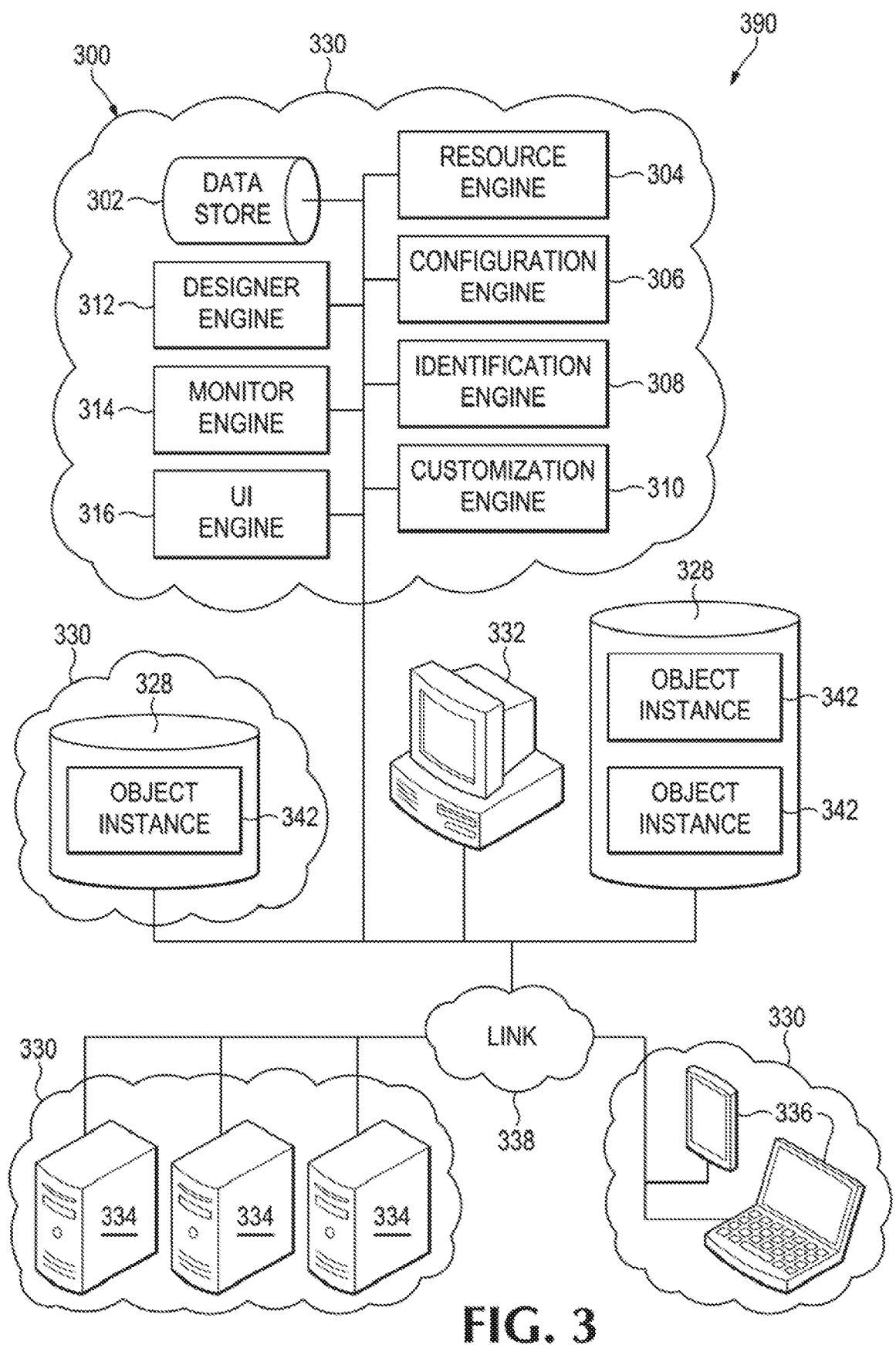
FIG. 3 depicts an example environment in which various cloud resource systems can be implemented

FIG. 3 depicts example environments in which various example cloud resource systems can be implemented. The example environment 390 is shown to include an example system 300 for managing cloud resources. The system 300 (described herein with respect to FIGS. 1 and 2) can represent generally any circuitry or combination of circuitry and executable instructions to reuse a cloud resource using a template. The system 300 can include a resource engine 304, a configuration engine 386, an identification 308, a customization engine 310, and a designer engine 312 that are the same as the resource engine 104, the configuration engine 106, the identification engine 108, the customization engine 110, and the designer engine 112 of FIG. 1, respectively, and the associated descriptions are not repeated for brevity. As shown in FIG. 3, the system 300 can also include a monitor engine 314 and a user interface ("UI") engine 316 and the engines 304, 306, 308, 310, 312, 314, and 316 can be integrated into a compute device, such as a service device 334. The engine 304, 306, 308, 310, 312, 314, and 316 can be integrated via circuitry or as installed instructions into a memory resource of the compute device.

The monitor engine 314 represents circuitry or a combination of circuitry and executable instructs to monitor the subscription requests. The monitor engine 314 can operate in conjunction with the resource engine 304 and the configuration engine 306 to manage the cloud resources in a dynamic manner based on the information received by the monitor engine 314. The UI engine 316 represents circuitry or a combination of circuitry and executable instructions to provide a UI for a user to make a subscription request, such as create a subscription or cancel a subscription. The system 300 can manage a pool 328 of object instances 342 having a composite of cloud resources. The composite of cloud resources (i.e. cloud resource object instance) can be designed for services offered via the service devices 334 based on subscriptions managed by a cloud broker.

The example environment 390 can include compute devices, such as administrator devices 332, service devices 334, and user devices 336. An administrator device 332 can be used by an administrator to provide input to configure the system 300. For example, a service designer can create a service design template and publish the service design template via the administrator device 332 as shown in FIG. 4B. For another example, a business service manager can attach a label to a template identified as popular, as shown in FIG. 4B, and provide threshold or methods for determining popularity via an administrator device 332 and The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices be located on separate networks 330 or part of the same network 330. The example environment 390 can include any appropriate number of networks 330 and any number of the networks 330 can include a cloud compute environment. A cloud compute environment includes a virtual shared pool of compute resources. For example, networks 330 can be distributed networks comprising virtual computing resources. Any appropriate combination of the system 300 and compute devices can bee virtual instance of a resource of a shared pool of resources. The engines and/or modules of the system 300 herein can reside and/or execute "on the cloud" (e.g., reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies routers, switches, load balancers, and the like.

Referring to FIGS. 1-3, the engines 104, 106, 108, 110, and 112 of FIG. 1 and/or the modules 204, 206, 208, 210, and 212 of FIG. 2 can be distributed across devices 332, 334, 336, or a combination thereof. The engine and/or modules can complete or assist completion of operations performed in describing another engine and/or module. For example, the resource engine 304 of FIG. 3 can request, complete, or perform the methods or operations described with the resource engine 104 of FIG. 1 as well as the configuration engine 106, the identification engine 108, and the customization engine 110 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. The engines of the system 300 can perform example methods described in connection with FIGS. 4A, 4B, and 5-8.

FIGS. 4A and 4B are block diagrams depicting example interactions of example cloud resource system components. Referring to FIG. 4A, the example blocks of FIG. 4A generally include a cloud portal 448, a resource engine 404, and a configuration engine 406. The cloud portal 448 represents a web portal for access to the cloud broker to manage subscriptions. The cloud portal 448 can provide both consumer access for users to select offerings and purchase subscriptions as well as administrative access for the service designers and business service managers. As shown in FIG. 4B, the service designer 456 can create a service design template 446 and publishes the service design template 456 via the cloud portal 448. The business service manager 444, as shown in FIG. 4B, can review the service design template created by the designer, attach a label if the template is popular, and adds the published template offering with tags 446 to the cloud portal 448.

Referring back to FIG. 4A, the portal 448 can provide an offering via a service template a tag 446 and a cloud user 450 can access the cloud portal 448 to create, cancel, or otherwise manage a subscription associable with the offering. Based on a request from the cloud user 450, the cloud portal 448 can interact with the resource engine 404 (and/or create a new resource at block 452) to assign an object instance associated with a template of a selected offering. The resource engine 404 can interact with the configuration engine 406 to access the pool of cloud resource objects The default behavior 454, such as flexing or other customizations to the resources, can occur according the broker principles to provide the service to the cloud user based on a subscription.

Figure 5:
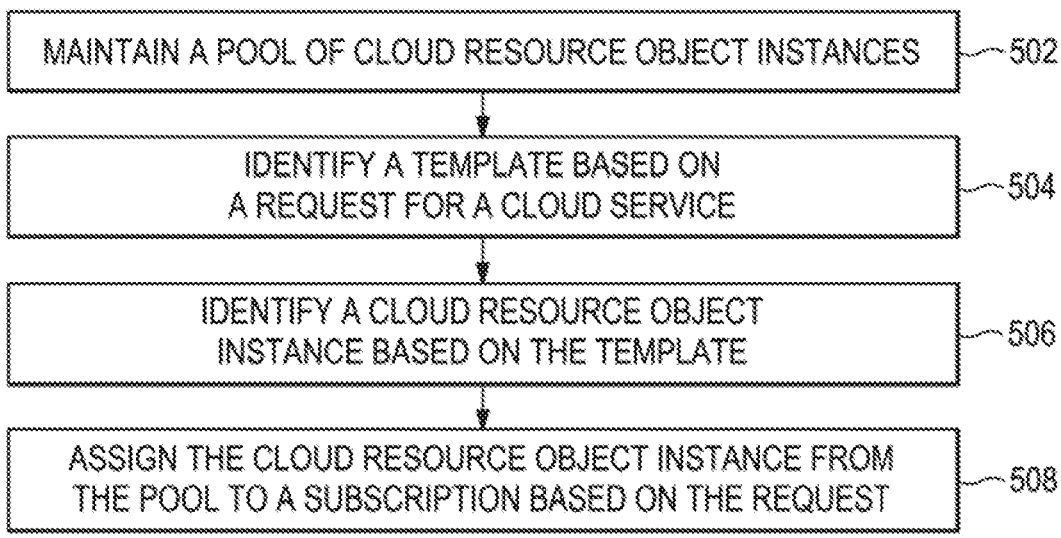
FIGS. 5-8 are flow diagrams depicting example methods of reusing a cloud resource.

FIGS. 5 end 6 are flow diagrams depicting example methods of reusing a cloud resource. Referring to FIG. 5, example methods managing a cloud resource can generally comprise maintaining a pool of cloud resource object instances, identifying a template, identifying a cloud resource object instance of the pool, and assigning the cloud resource object instance from the pool to a subscription based on the request.

At block 502, a pool of cloud resource object instances is maintained, Each cloud resource object instance includes a plurality of cloud resources. Thus, a cloud resource object instance is a composite of cloud resources associable with a template used to describe and offer a service. The pool of cloud resource object instances can be maintained based on a template. For example, the pool can contain object instances associated with a set of templates designated as popular and be maintained based on the set of templates.

At block 504, a template is identified based on a request for a cloud service. A service of the request can be identified and the template of resources associated with the service can be identified. The template is a composite of cloud resources particularized for the service. In this manner, a template can be compared to a cloud resource object instance. A cloud resource object instance is identified based on the template at block 506. For example, a first cloud resource object instance of a plurality of cloud resource object instances in the pool can be identified for use with a service based on a match between the first cloud resource object instance and the template for the service. At block 508, the cloud resource object instance is assigned from the pool to a subscription based on the request. For example, the request may contain the selected offering and some initial parameters that describe the configuration of the cloud resource object instance, and a cloud resource object of the pool that fits the configuration can be assigned to the subscription associated with the request.

Figure 6:
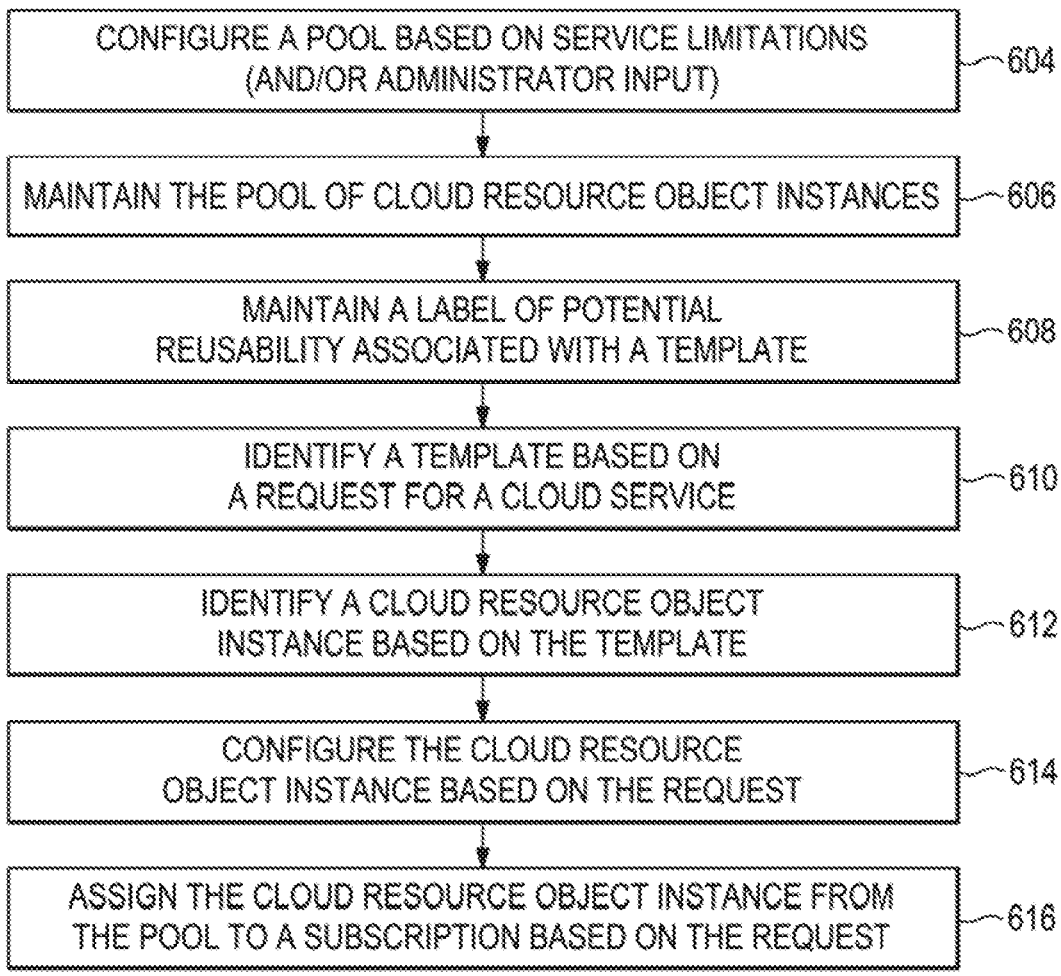

FIG. 6 includes blocks similar to blocks of FIG. 5 and provides additional blocks and details. In particular, FIG. 6 depicts additional blocks and details generally regarding configuring the pool, maintaining a label of potential reusability, and configuring the cloud resource object. Blocks 606, 610, 612, and 616 are the same as blocks 502, 504, 506, and 508 of FIG. 5 and, for brevity, their respective descriptions are not been repeated.

At block 504, a pool is configured based on service limitations and/or administrator input. The configuration of the pool can be determined by parameters to limitations set on the cloud broker system or otherwise enable management of the pool.

At block 608, a label of reusability associated with a template is maintained. The label can be maintained within a data structure associated with a template or based on dynamic analysis, such as a function call to determine reusability using the template and/or service as the input. The label can be based on one of popularity of the template and frequency of request associated with the service of the template. The identification of the cloud resource object instance at block 612 can be based on potential reusability using the label associated with a template.

At block 614, the cloud resource object instance can be configured based on the request. For example, the cloud resource object can be customized based on the particulars of the subscription request (e.g., creating user data or accounts or flexing a resource). For another example, additional resource may be added to the subscription, such as when a template is used as a base for a service and additional functionality can utilize another tier of infrastructure or application components.

Figure 7:
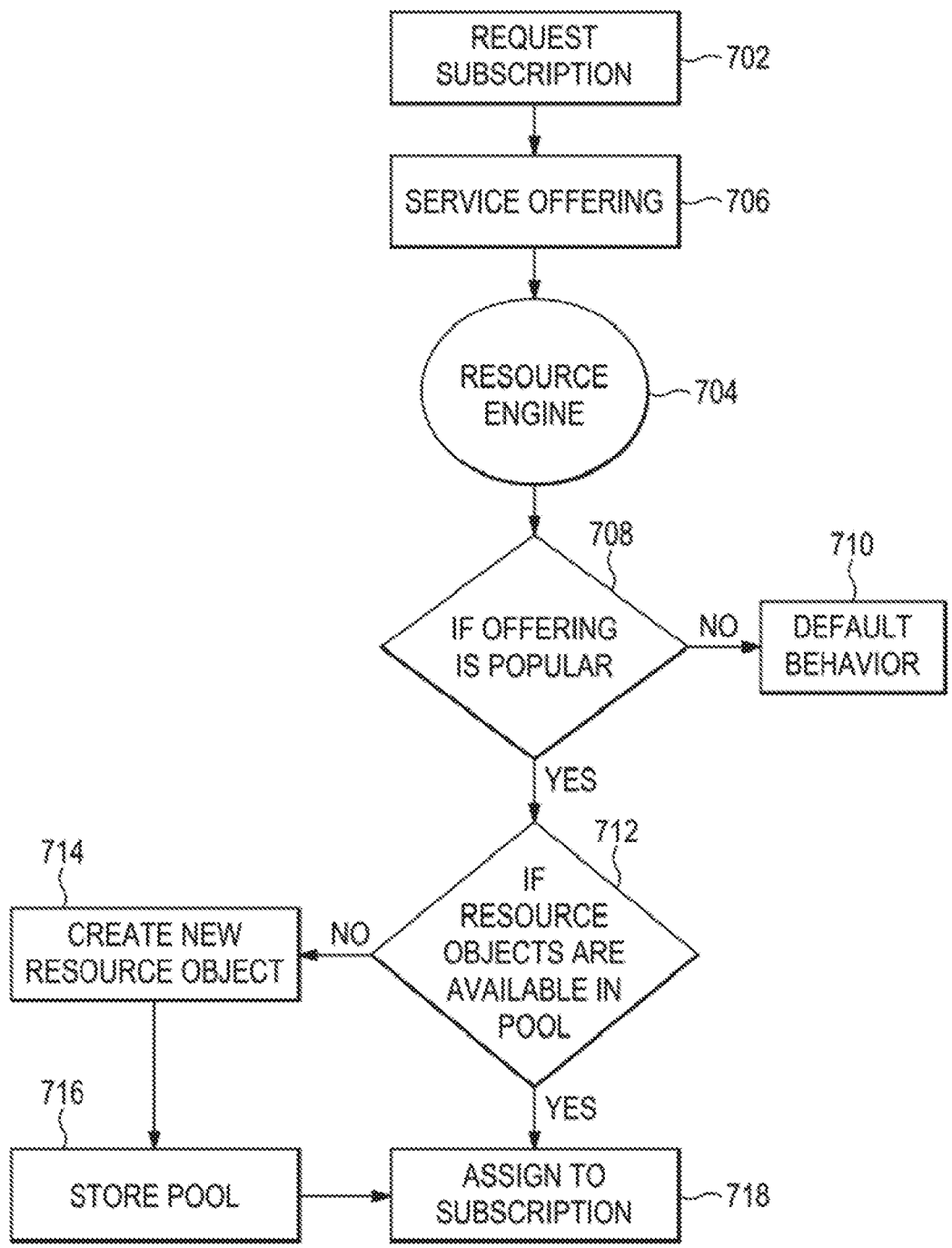

FIG. 7 depicts a flow diagram of an example user request for a subscription. At block 702, a user requests a subscription and, at block 706, selects service offering provided by the cloud broker via the cloud portal. The service offering of the subscription may start with a base template and other templates may be added to the subscription based on the selected service offerings. The request is sent to the resource engine 704 to manage the subscription request. A determination of popular is made at block 705. If the offering is not popular, then a collection of resources may not be in the pool and the default behavior of creating a resource for the service can occur at block 710. If the offering is identified as popular, then the pool can be checked for availability of a cloud resource object instance If a cloud resource object instance is available in the pool, the cloud resource object instance can be assigned to the subscription at block 718. If there is not an available instance to assign to the subscription (and the service offering is popular), a new resource object instance can be caused to be created at block 714. The newly created cloud resource object instance can be stored in a pool (or a pool can be created for the new resource object instance) at block 716. The updated pool can then be used to provide the newly created resource object to the subscription.

Figure 8:
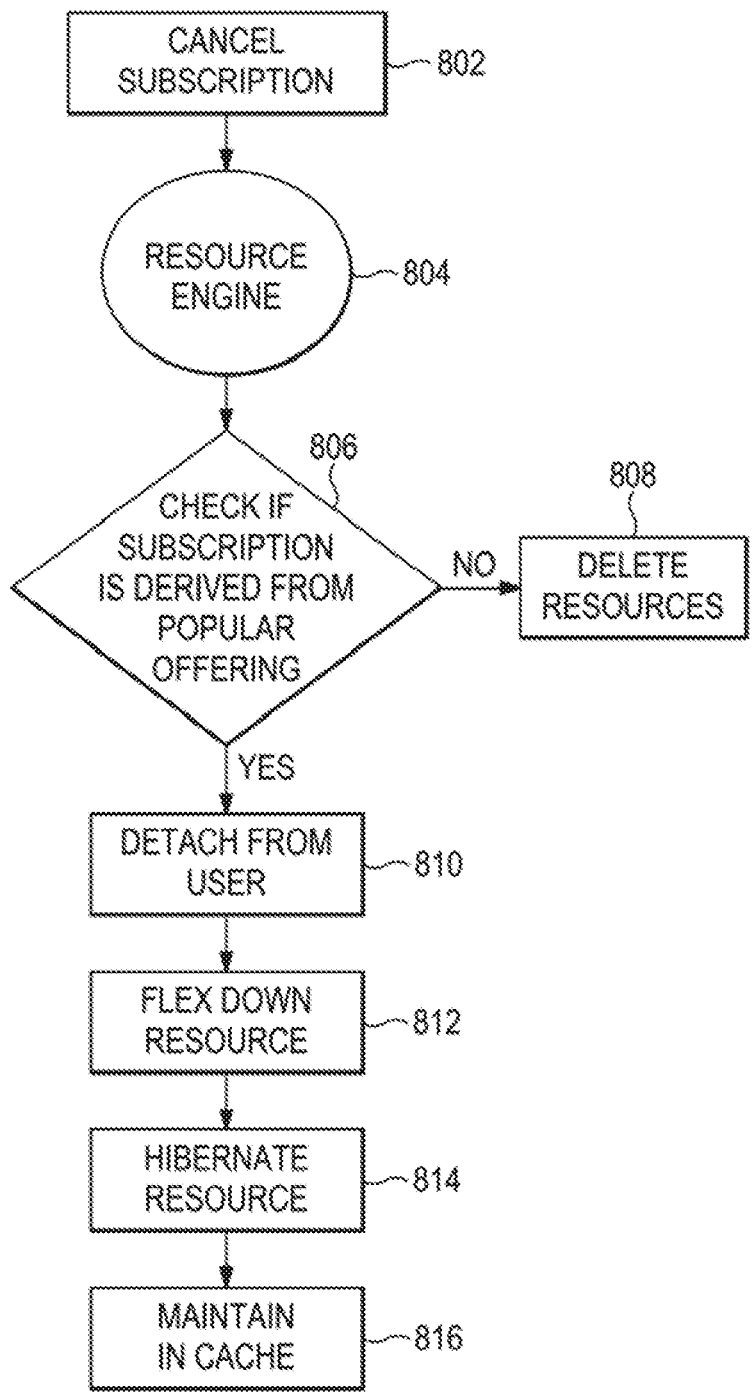

FIG. 8 depicts a flow diagram of an example subscription cancellation request. At block 802, a user requests cancellation of their subscription via the cloud portal. In response to the cancellation request, the request is sent to the resource engine 804. At block 806, the subscription is checked for whether it is associated with a popular offering. For example, the tag associated with the template of the offering may indicate a popularity level (i.e. a level of potential reusability).

If the subscription is not identified as popular, the resources of the offering are deleted at block 808. If the subscription is identified as deriving from a popular offering, the cloud resource object instance associated with the subscription is prepared for reuse by detaching, cleaning, and placing the cloud resource object instance into a pool for reuse by another subscription. As shown in FIG. 8, the cloud resource object instance is detached from the subscription at block 810, the resources of the cloud resource object instance are flexed down to a base level at block 812 (e.g. an average or minimum level of a resource that may be requested), the resources of the cloud resource object instance are placed into hibernation at block 814, and the resources of the cloud resource object instance are maintain in a cache for future reuse triggered by a future subscription request at block 816, whether by the same user or another user. The cloud resource object instance can be cleaned when the instance is released from the subscription to facilitate reuse with subscriptions not associated with the user.

Cleaning a cloud resource object instance can include removing custom configurations, reverting a snapshot to a base version, hibernating a resource (e.g. pausing a resource from execution) to avoid inefficiencies, sanitizing the resources from personal data, and flexing down the resource to a common level (such as decreasing the virtual CPU and memory). By cleaning the cloud resource object instance, the next request for the cloud resource object from pool can provide the cloud resource object instance without recreating the instance and the instance is ready for flexing or other customization. These custodial activities decrease the power foot print used by the resources during the time the resources reside in the pool awaiting assignment. In this manner, the pool can be maintained with cloud resource object instance available for configuration and reuse by a subscription.

Although the flow diagrams of FIGS. 5-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. However, other forms, details, and examples may be made without departing from the spirit and scope of the following claims.

What is claimed is:

1. A cloud resource system comprising:
   a processor; and
   a memory resource including instructions executable by the processor to:
   identify a cloud resource based on a template comprising a composite of cloud resources;
   assign the cloud resource based on a subscription and the template;
   maintain a pool of cloud resource object instances including a first cloud resource object instance of the cloud resource object instances having a composition of resources associated with the template;
   identify a reusability potential of a second cloud resource object instance, wherein the reusability potential of the second cloud resource object instance is based on a quantity of requests for the second cloud resource object instance over a period of time;
   add the second cloud resource object instance to the pool of cloud resource object instances based on the reusability potential of the second cloud resource object instance; and
   maintaining a label of reusability associated with the template,
   wherein the label is based on one of popularity of the template and frequency of requests associated with the template and identifying the cloud resource object instance is based on the reusability potential of the cloud resource object instance.

2. The system of claim 1, wherein the second cloud resource object instance is added to the pool of cloud resource object instances when the quantity of requests exceeds a minimum number of requests per day.

3. The system of claim 1, comprising instructions to:
modify the cloud resource object instance.

4. The system of claim 1, comprising instructions to:
verify the pool of cloud resource object instances contains the first cloud resource object instance based on the template;
create the first cloud resource object instance based on the template when the pool does not contain the first cloud resource object; and
add the first cloud resource object instance to the pool.

5. The system of claim 1, comprising instructions to:
model the template based on a composite resource context for a subscription; and
publish the template.

6. A non-transitory computer readable storage medium comprising a set of instructions executable by a processor resource to:
identify a cloud resource object instance based on a composite resource template and a reusability potential, wherein the reusability potential of the cloud resource object instance is based on a quantity of requests for the cloud resource object instance over a period of time;
add the cloud resource object instance to a pool of cloud resource object instances based on the reusability potential of the cloud resource object instance;
configure the cloud resource object instance of the pool based on a subscription request;
assign the cloud resource object instance based on the subscription request; and
maintain a label of reusability associated with the template,
wherein the label is based on one of popularity of the template and frequency of requests associated with the template and identifying the cloud resource object instance is based on the reusability potential of the cloud resource object instance.

7. The medium of claim 6, wherein the set of instructions to configure the cloud resource object instance, when executed, cause the processor resource to:
flex a resource of the cloud resource object instance one of up and down based on a service of the subscription request.

8. The medium of claim 6, wherein the set of instructions is executable by the processor resource to:
design the composite resource template as a configuration framework of a combination of infrastructure and applications, the combination of infrastructure and applications to be loadable on the cloud resource stack to provide a service.

9. A method of reusing a cloud resource comprising:
maintaining a pool of cloud resource object instances, wherein a cloud resource object instance to include a plurality of cloud resources;
identifying a reusability potential of a cloud resource object instance, wherein the reusability potential of the cloud resource object instance is based on a quantity of requests for the cloud resource object instance over a period of time;
adding the cloud resource object instance to the pool of cloud resource object instances based on the reusability potential of the cloud resource object instance;
identifying a template based on a request for a cloud service, the template comprising a composite of the plurality of cloud resources;
identifying the cloud resource object instance from the pool of cloud resource object instances based on the template;
assigning the cloud resource object instance from the pool to a subscription based on the request;
maintaining a label of reusability associated with the template,
wherein the label is based on one of popularity of the template and frequency of requests associated with the template and identifying the cloud resource object instance is based on the reusability potential of the cloud resource object instance.

10. The method of claim 9, comprising:
configuring the cloud resource object instance based on the request; and
adding additional resources to the subscription.

11. The method of claim 9, comprising:
configuring the pool based on one of service limitations and administrator input.

12. The method of claim 9, comprising, in response to a subscription cancellation:
identifying the cloud resource object instance is derived from a popular offering;
detaching the cloud resource object instance from the subscription;
cleaning the cloud resource object instance when the cloud resource object instance is released from the subscription; and
placing the cloud resource object instance into the pool.

* * * * *